US005373083A

United States Patent [19]

[11] Patent Number: 5,373,083

[45] Date of Patent: Dec. 13, 1994

King, Jr. et al.

[54] THERMOPLASTIC RESIN AND METHOD USING HETEROCYCLIC AMINE CATALYST

[75] Inventors: Joseph A. King, Jr., Schenectady, N.Y.; Klaas Brouwer, CL Bergen op Zoom, Netherlands

[73] Assignee: General Electric Company, Pittsfield, Mass.

[21] Appl. No.: 78,374

[22] Filed: Jun. 17, 1993

[51] Int. Cl.[5] .............................................. C08G 64/00

[52] U.S. Cl. .................................... 528/199; 528/196; 528/198

[58] Field of Search ........................ 528/199, 198, 196

[56] References Cited

U.S. PATENT DOCUMENTS 4,316,980 2/1982 Idel et al. ........................... 528/199
4,316,981 2/1982 Brunell ............................... 528/199
4,695,620 9/1987 Masumoto et al. ................. 528/204
4,880,897 11/1989 Ho et al. ............................ 528/199
4,889,911 12/1989 Pielartzik et al. .................. 528/199
5,025,083 6/1991 Ueda et al. .......................... 528/199
5,149,770 9/1992 Kanno et al. ....................... 528/199

*Primary Examiner*—John Kight, III
*Assistant Examiner*—Richard Jones

[57] ABSTRACT

The present invention discloses thermoplastic resins and methods for producing said resins utilizing a single component heterocyclic amine catalyst system. More particularly, the invention discloses resins such as high molecular weight polycarbonate resins that are produced by a solventless melt condensation reaction between diphenol carbonate (DPC) and bisphenol A (BPA) in the presence of a heterocyclic amine catalyst.

16 Claims, No Drawings

THERMOPLASTIC RESIN AND METHOD USING HETEROCYCLIC AMINE CATALYST

The present invention relates to thermoplastic resins and methods for producing said resins utilizing a single component heterocyclic amine catalyst system. More particularly, the invention relates to resins such as high molecular weight polycarbonate resins that are produced by a solventless melt condensation reaction between diphenol carbonate (DPC) and bisphenol A (BPA) in the presence of a heterocyclic amine catalyst.

BACKGROUND OF THE INVENTION

A large number of catalytic systems have been examined for application to melt polycarbonates. Most of these methods require either a variety of co-catalysts or the subsequent addition of a catalyst quencher to ensure polymer stability. The need for high purity, high quality thermoplastic resins requires the reduction of residual contaminants in the final resin. This need for minimal residual impurities is particularly acute in optical quality (OQ) grade polycarbonate resins. One approach towards elimination of residual solvent contamination—particularly methylene chloride—is through the implementation of a solventless (melt) process.

Most current melt technology programs employ a two component catalyst system. The first component is tetramethylammonium hydroxide (TMAH or $\beta$-catalyst) which is used to initiate oligomer formation in the melt. The TMAH decomposes in the first two reactors to produce a variety of products, some of which contaminate the final polymer. The second catalyst is sodium hydroxide ("sodium" or Na: the $\alpha$-catalyst) which is the finishing catalyst. Due to its intrinsic stability, the $\alpha$-catalyst must be quenched. This quenching process requires the addition of yet another component to the polymer formulation. All the materials from the quenching process remain in the final resin, further contaminating the final polymer.

The use of a thermally stable, volatile heterocyclic amine catalyst circumvents the degradation problem of the $\beta$-catalyst and the need for additional reagents due to the use of an $\alpha$-catalyst. The advantage of volatile amines are that they are "self-quenching", i.e., these catalysts slowly distill from the resin over the course of the reaction. As a result, no additional quencher is needed and no detrimental catalyst residue is left in the final resin.

SUMMARY OF THE INVENTION

A variety of basic nitrogen heterocyclic catalysts and complex nitrogen-containing organic bases were examined for their efficiency to form thermoplastic resins in general, and bisphenol A ("BPA") polycarbonates in particular. The following amines exhibit excellent polymer build and molecular weight distribution: 1,10-Phenanthroline (Phen), 2,2'-Dipyridyl (Bipy), 2-Phenylimidazole, 1,8-Diazobicyclo[5.4.0]undec-7-ene (DBU), 1,1,3,3-Tetramethylguanidine, Imidazo[1,2-a]pyridine, and 2,2':6',2"-Terpyridine.

Early attempts to use amines to catalyze the formation of polycarbonate oligomers gave little or no reaction, leading to the abandonment of this type of approach. Inadequate polymer formation is not a problem with the present process. High molecular weight polycarbonate resins are readily produced with these heterocyclic amines. A variety of polycarbonate grades may be made with applicants' method by merely controlling the catalyst loading and reaction conditions (i.e., temperatures, pressures, and residence times). At a given catalyst loading, the higher the boiling point of the heterocyclic amine, the higher the intrinsic viscosity ("IV") build in the finishing stage of the reaction. This change in finishing reactivity versus catalyst boiling point is one indication that this species is distilling from the resin. Hard evidence for the "self-quenching" ability of the volatile catalysts comes from examination of the overhead distillate from the melt reactor. Gas chromatography ("GC/GCMS") analysis of the overheads indicates the catalyst distills unchanged during the course of the reaction. Thus, no undesirable catalyst residue results from the use of these systems. The rate of loss of catalyst from the system is a function of its boiling point and the reaction conditions. Furthermore, the catalysts can be recovered from the overheads and reused if desired.

A number of variations will be immediately apparent to those of skill in the art. In one such variation, the disclosed catalysts can be used in combination in order to optimize the process. Thus, for example, a large amount of a very low boiling heterocyclic amine can be used to rapidly generate oligomers (with/without high end-capping). A small amount of a high boiling heterocyclic amine could then be used as a finishing catalyst in conjunction with the low(er) boiling species. This combination could be used in order to produce high molecular weight polymers with an appropriately tailored end-capping percentage.

of course, the present invention should not be limited to the heterocyclic amines listed above. Any mono- or poly-nitrogen containing heterocyclic compound such as 1,6-diazacyclo[4.3.0]non-5-ene DBN, imidazopyridines, triazoles, pyridines, dipyridines, terpyridines, phenanthrolines, quinolines, isoquinolines, as well as simple amidines and guanidines should effectively catalyze this process. Optimization of the catalyst loading, organic base boiling point, reaction temperatures, pressure, and residence times improve the process further.

The invention is also not limited to the BPA homopolymer. Any base-catalyzed reaction for the formation of polycarbonates, polyesters, polyamides, polyestercarbonates, polyesteramides, and polyamidecarbonates, whether branched, unbranched, homo- or copolymers, will work. Other dihydric phenols that can be employed in the practice of this invention include bis(4hydroxyphenyl)methane, 1,1-bis(4-hydroxyphenyl)ethane, 2,2bis(4-hydroxyphenyl)propane, also called bisphenol-A or BPA, 2,2-bis(4-hydroxy-3-methylphenyl)propane, 3,3-bis(4hydroxyphenyl)pentane, 2,2-bis(4-hydroxyl-3chlorophenyl)propane, 2,2-bis(4-hydroxy-3,5-dibromophenyl)propane, 1,1-bis(4-hydroxyphenyl)cyclohexane, p,p'-dihydroxydiphenyl, 3,3-dichloro-4,4'dihydroxydiphenyl, bis(4-hydroxyphenyl)ether, bis(4hydroxyphenyl)sulfone, bis(3,5-dimethyl-4-hydroxyphenyl)sulfone, resorcinol, hydroquinone, 1,4-dihydroxy-2,5-dichlorobenzene, 1,4-dihydroxy-3methylbenzene, bis(4-hydroxyphenyl)sulfoxide, bis(3,5-dimethyl-4-hydroxyphenyl)sulfoxide, etc. Additional dihydric phenols can also be employed such as are disclosed in U.S. Pat. Nos. 2,999,835; 3,028,365; 3,153,008; and 4,001,184. It is, of course, possible to employ two or more different dihydric phenols or a copolymer of a dihydric phenol with glycol or with hydroxy or acid terminated polyester, or with a dibasic acid in the event a polycarbonate copolymer or interpolymer (co-polyester-carbonate), rather than a homopolymer, is desired. The preferred dihydric phenol is bisphenol-A (BPA).

Typical of the carbonate esters which may be employed herein are diphenyl carbonate, di(halophenyl) carbonates such as di-(chlorophenyl) carbonate, di-(bromophenyl) carbonate, di-(trichlorophenyl) carbonate, di(tribromophenyl) carbonate, etc., di-(alkylphenyl) carbonate such as di(tolyl) carbonate, etc., di-(naphthyl) carbonate, di-(chloronaphthyl carbonate, phenyl tolyl carbonate, chlorophenyl chloronaphthyl carbonate, etc., or mixtures thereof. Diphenyl carbonate is preferred.

Finally, the process can be applied to produce oligomeric materials, as well. Thus, either simple or crystalline oligomeric compositions can be generated by the disclosed process. The oligomeric materials can then be polymerized to produce a desired grade of material.

DETAILED DESCRIPTION OF THE PREFERRED EMBODIMENTS

Two experimental reaction sequences were used for the polymer preparation. The first is a short run procedure that quickly screens catalyst activity, polymer color, rate of IV build, etc. Its short run times allow efficient, qualitative catalyst screening. A second, longer procedure is used as a secondary check for catalyst activity; the IV builds are always better (higher) under these conditions, but the run times are hours longer. The reactions were all run for prescribed lengths of time, not polymer build to allow comparison of the catalytic efficiency. The listed IVs do not indicate a limit to the polymer molecular weight these systems could produce if run for extended periods of time. Occasionally, the dispersivities are listed twice for each sample. The first value reflects the use of 1000 molecular weight as a cut-off point for sampling while the $(M_w/M_n)_{all}$ represents an alternative practice of reporting the total GPC data. The reaction materials were from the following sources: BPA and DPC—General Electric; heterocyclic amine catalysts—Aldrich Chemical Company. The reactor vessels were made out of pyrex glass unless specified otherwise. It should be noted that under the disclosed reaction conditions these DPC/BPA compositions do not produce polycarbonate without the addition of catalyst.

The present invention is more fully defined in the following illustrative, non-limiting Examples:

EXAMPLE 1

2-Phenylimidazole Catalyst

BPA (136.98 g; 0.600mol) and DPC (133.67g; 0.624mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). Into this solution was added the 2-phenylimidazole catalyst (110.3 mg; $7.5\times10^{-4}$ mol). The reaction solution was stirred for 250 rpm unless otherwise stated. At this time the reaction temperature was raised to 210° C. and the pressure lowered to 175 torr. No phenol distilled from the reactor vessel during this period. After 25 min, the reactor pressure was lowered to 100 torr and held there for another 25 min. Phenol continued to distill into the receiver flask (1 drops/sec). The reactor pressure was lowered to 15 torr while the temperature was raised to 250° C. These conditions were held for 30 min (fast flow out of reactor; 1–3 drop/sec-DPC). The pressure was dropped to 2 torr while the temperature was increased to 285° C. These conditions were maintained for 10 min (flow to receiver approx. 1 drop/2 sec; solids in receiver-BPA). The final stage of the reaction was initiated by placing the melt material under full vacuum (0.7 torr; 1.5 tort at the reactor head) at 305° C. for 1 h. No foaming occurred in this reaction. The melt polycarbonate appeared colorless with an $IV_{methylene\ chloride}=0.231$ dl/g. The receiver mass (distillate; phenol $+DPC+BPA_{trace})=153.1$ g; theoretical distillate mass $(phenol+DPC_{excess})=118.1$ g. Polymer yield was quantitative. $M_w=3{,}760$, $M_n=2{,}570$, $M_w/M_n=1.50$, $(M_w/M_n)_{all}=2.28$.

EXAMPLE 2

Imidazo[1,2-a]pyridine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 tort and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). Into this solution was syringed the imidazo[1,2-a]pyridine catalyst (76.8 ml; $7.5\times10^{-4}$ mol). The resulting solution was stirred for 5min at 180° C. The stirring rate was held at 250 rpm unless otherwise stated. At this time the reaction temperature was raised to 210° C. and the pressure lowered to 175 torr. After a couple of minutes, phenol began to distill out of the reactor vessel into an evacuated receiver flask (very slow flow to receiver). After 25 min, the reactor pressure was lowered to 100 tort and held there for another 25 min. Phenol continued to distill into the receiver flask (1 drop/sec). The reactor pressure was lowered to 15 tort while the temperature was raised to 250° C. These conditions were held for 30 min (approx. 1 drop/3–5 sec flow). The pressure was dropped to 2 torr while the temperature was increased to 285° C. These conditions were maintained for 10 min (flow to receiver approx. 1 drop/10 sec). The final stage of the reaction was initiated by placing the melt material under full vacuum (0.4 torr at the pump head) at 305° C. for 0.5 h. The pressure at the reactor head never got below 0.85 torr. No foaming occurred during this reaction. The melt polycarbonate appeared colorless with an $IV_{methylene\ chloride}=0.245$dl/g. The receiver mass (distillate; $phenol+DPC+BPA_{trace})=122.0$ g; theoretical distillate mass $(phenol+DPC_{excess})=118.1$ g. Polymer yield was quantitative. $M_w=4{,}580$, $M_n=2{,}874$, $M_w/M_n=1.59$, $(M_w/M_n)_{all}=2.36$.

EXAMPLE 3

1,10-Phenanthroline Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). Into this solution was added the phenanthroline catalyst (136.5 ml; $7.5\times10^{-4}$ mol). The resulting solution was stirred for 5 min at 180° C. The reaction solution was stirred at 250 rpm unless otherwise stated. At this time the reaction temperature was raised to 210° C. and the pressure lowered to 175 torr. No phenol distilled from the reactor vessel initially- After 25 min, the reactor pressure was lowered to 100 torr and held there for another 25 min. Phenol started to distill into the receiver flask (1–3 drop/sec)The reactor pressure was lowered to 15 torr while the temperature was raised to 250° C. These conditions were held for 30 min (approx. 1 drop/2 sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (0.40 torr; 0.8 reactor head pressure) at 305° C. for 0.5 h. Foaming began immediately when the temperature reached 305° C. and continued for about 10 min. The melt polycarbonate had an $IV_{methylene\ chloride}$=0.384 dl/g. The receiver mass (distillate; phenol+DPC+$BPA_{trace}$)=118.3 g; theoretical distillate mass (phenol+$DPC_{excess}$)=118.1 g. Polymer yield was quantitative. $M_w$=15,790, $M_n$=7,705, $M_w/M_n$=2.05, $(M_w/M_n)_{all}$=2.81.

EXAMPLE 4

2,2'Dipyridyl (Bipy) Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). The solution was stirred at 250 rpm unless otherwise stated. Into this solution was added the bipy catalyst (118.3 mg; $7.5\times10^{-4}$ mol). The resulting solution was stirred for 5 min at 180° C. At this time the reaction temperature was raised to 210° C. and the pressure lowered to 175 torr. No phenol distilled from the reactor vessel during this period. After 25 min, the reactor pressure was lowered to 100 torr and held there for another 25 min. Phenol started to distill into the receiver flask (1 drop/sec). The reactor pressure was lowered to 15 torr while the temperature was raised to 250° C. These conditions were held for 30 min (approx. 1 drop/sec flow). The pressure was dropped to 2 torr while the temperature was increased to 285° C. These conditions were maintained for 10 min (flow to receiver approx. 1 drop/3 see). The final stage of the reaction was initiated by placing the melt material under full vacuum (1.5 torr; 2.2 at the reactor head) at 305° C. for 0.5 h. Foaming began after 8 min at 305° C. and continued for about 5 min. The stirring rate was lower to 100 rpm and kept there for the remainder of the reaction. The melt polycarbonate had an $IV_{methyl\ chloride}$=0.464 dl/g. The receiver mass (distillate; phenol+DPC+$BPA_{trace}$)=117.1 g; theoretical distillate mass (phenol+$DPC_{excess}$)=118.1 g. Polymer yield was quantitative. $M_w$=22,525, $M_n$=10,496, $M_w/M_n$=2.14, $(M_w/M_n)_{all}$=2.72.

EXAMPLE 5

2,2':6',2"-Terpyridine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). The solution was stirred at 250 rpm unless otherwise stated. Into this solution was added the terpyridine catalyst (178.5 mg; $7.5\times10^{-4}$ mol). The resulting solution was stirred for 5 min. At this time the reaction temperature was raised to 210° C. and the pressure lowered to 175 torr. After a few minutes, phenol began to distill out of the reactor vessel into an evacuated receiver flask (1 drop/sec). After 25 min, the reactor pressure was lowered to 100 tort and held there for another 25 min. Phenol continued to distill into the receiver flask (1 drop/sec). The reactor pressure was lowered to 15 tort while the temperature was raised to 250° C. These conditions were held for 30 min (approx. 1 drop/sec flow). The pressure was dropped to 2 tort while the temperature was increased to 285° C. These conditions were maintained for 10 min (flow to receiver approx. 1 drop/3 sec). The final stage of the reaction was initiated by placing the melt material under full vacuum (0.50 torr; 0.8 at the reactor head) at 305° C. for 0.75 h. Foaming began after 8 min at 305° C. and continued for about 7 min. After 25 min the stirring rate was lowered to 150 rpm due to the polymer viscosity build. The melt had an $IV_{methylene\ chloride}$=0.432 dl/g. The receiver mass (distillate; phenol+DPC+$BPA_{trace}$)=118.6 g; theoretical distillate mass (phenol+$DPC_{excess}$)=118.1 g. Polymer yield was quantitative. $M_w$=18,942, $M_n$=9,203, $M_w/M_n$=2.03, $(M_w/M_n)_{all}$=2.86.

EXAMPLE 6

1,8-Diazabicyclo [5.4.0]undec-7-ene (DBU) Catalyst

BPA (136.98 g; 0.600 mol) and DPC (133.67 g; 0.624 mol) were added into a liter melt polymerizer apparatus as powders. The reactor vessel was deoxygenated by evacuating it to about 1 tort and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). Into this solution was added the DBU catalyst (114.5 ml; $7.5\times10^{-4}$ mol). The resulting solution was stirred for 5 min at 180° C. The reaction solution was stirred at 250 rpm unless otherwise indicated. At this time the reaction temperature was raised to 210° C. and the pressure lowered to 175 torr. The phenol began to distill out of the reactor vessel into an evacuated receiver flask immediately (3-5 drop/sec). After 25 min, the reactor pressure was lowered to 100 torr and held there for another 25 min. Phenol continued to distill into the receiver flask (2 drop/sec). The reactor pressure was lowered to 15 torr while the temperature was raised to 250° C. These conditions were held for 30 min (approx. 1 drop/3 sec flow). The pressure was dropped to 2 tort while the temperature was increased to 285° C. These conditions were maintained for 10 min (flow to receiver approx. 1 drop/5 sec). The final stage of the reaction was initiated by placing the melt material under full vacuum (0.48 torr; 0.78 at the reactor head) at 305° C. for 0.5h. Foaming began after 12 min at 305° C. and continued for about 13 min. After 25 min the stirring rate was lowered to 150 rpm and kept there for the remainder of the reaction. The melt had an $IV_{methylene\ chloride}=0.423$ dl/g. The receiver mass (distillate; phenol $+DPC+BPA_{trace})=117.6$ g; theoretical distillate mass $(phenol+DPC_{excess})=118.1$ g. Polymer yield was quantitative. $M_w=18,889$, $M_n=9,135$, $M_w/M_n=2.07$, $(M_w/M_n)_{all}=2.63$.

EXAMPLE 7

1,1,3,3-Tetramethylguanidine Catalyst

BPA (136.98 g; 0.600 mol) and DPC (133.67 g; 0.624 mol) were added into a liter melt polymerizer apparatus as powders. The reactor vessel was deoxygenated by evacuating it to about 1 torr and then refilling the apparatus with nitrogen. This deoxygenation procedure was repeated three times. The reactor vessel was immersed in a fluidized heat bath preheated to 180° C. The DPC/BPA mixture was allowed to melt, producing a colorless, homogeneous liquid; once a small amount of the mixture melts, the remaining material can be stirred slowly to promote better heat exchange. The system was allowed to thermally equilibrate (5–10 min). Into this solution was syringed the guanidine catalyst (95.7 ml; $7.5\times10^{-4}$ mol). The resulting solution was stirred for 5 min at 180° C. At this time the reaction temperature was raised to 210° C. and the pressure lowered to 175 torr. After a couple of minutes, phenol began to distill out of the reactor vessel into an evacuated receiver flask (2 drop/sec). After 25 min, the reactor pressure was lowered to 100 torr and held there for another 25 min. Phenol continued to distill into the receiver flask (1 drop/sec). The reactor pressure was lowered to 15 torr while the temperature was raised to 250° C. These conditions were held for 30 min (approx. 1 drop/sec flow). The pressure was dropped to 2 torr while the temperature was increased to 285° C. These conditions were maintained for 10 min (flow to receiver approx. 1 drop/5 sec). The final stage of the reaction was initiated by placing the melt material under full vacuum (0.50 torr) at 305° C. for 0.5 h. Foaming began after 17 min at 305° C. and continued for about 15 min. The melt polycarbonate appeared light yellow with an $IV_{methylene\ chloride}=0.354$ dl/g. The receiver mass (distillate; phenol $+DPC\ BPA_{trace})=123.1$ g; theoretical distillate mass $(phenol+DPC_{excess})=118.1$ g. Polymer yield was quantitative. $M_w=11,948$, $M_n=6,187$, $M_w/M_n=1.93$, $(M_w/M_n)_{all}=2.62$.

The foregoing examples were given by way of illustration of the invention and are not to be construed as a limitation thereof. Obviously, other modifications and variations of the present invention are possible in light of the above teachings. It is therefore to be understood that changes may be made in the particular embodiments of the invention described which are within the full intended scope of the invention defined by the appended claims.

What is claimed is:

1. An improved melt condensation process for preparing a polycarbonate resin wherein said resin is prepared in the presence of a base catalyst wherein the improvement comprises employing a nitrogen-containing compound selected from the group consisting of heterocyclic amines, nitrogen-containing heterocyclic compounds amidines and guanidines wherein said compound is volatile and distills from the resin unchanged over the course of the reaction whereby no undesirable catalyst residue results.

2. A melt condensation process for preparing a polycarbonate wherein diphenyl carbonate is reacted with bisphenol A in the presence of a catalyst selected from the group consisting of heterocyclic amines, nitrogen-containing heterocyclic compounds, amidines and guanidines wherein said catalyst is volatile and distills from the resin unchanged over the course of the reaction whereby no undesirable catalyst residue results.

3. An improved process for preparing a polycarbonate wherein a dihydric phenol and a carbonate ester are melt condensed in the presence of a catalyst selected from the group consisting of heterocyclic amines, nitrogen containing heterocyclic compounds, amidines and guanidines wherein said catalyst is volatile and distills from the resin unchanged over the course of the reaction whereby no catalyst residue results.

4. A process according to claim 3 wherein said dihydric phenol and said carbonate ester are reacted with a 1 to 25 molar excess of said carbonate ester.

5. A melt-condensation process for preparing a polycarbonate resin comprising the steps of:

(a) mixing the component parts of said resin and a catalyst selected from the group comprising heterocyclic amines, nitrogen-containing heterocyclic compounds, amidines and guanidines in a suitable reaction vessel;

(b) gradually increasing the temperature within said vessel; and (c) gradually decreasing the pressure in said reaction vessel;

wherein the catalyst distills from the resin unchanged over the course of the reaction whereby the resulting resin is substantially free of catalytic contaminants.

6. A process according to claim 5 wherein said thermoplastic resin is a polycarbonate.

7. A process according to claim 5 wherein said components parts are bisphenol-A and diphenylcarbonate.

8. A process according to claim 5 wherein said temperature ranges from about 180° C. to 350° C.

9. A process according to claim 5 wherein said pressure ranges from about 200 torr to about 0.1 torr.

10. A process according to claim 1 wherein said nitrogen-containing compound is selected from the group 1,10-phenanthroline, 2,2'-dipyridyl, 2-phenylimidazole, 1,8diazobicyclo[5.4.0]undec-7-ene, 1,1,3,3-tetramethylguanidine, imidazo[1,2-a]pyridine, and 2,2':6'2"-terpyridine.

11. A process according to claim 1 wherein said nitrogen-containing compound is selected from the group consisting of 1,6-diazacyclo [4.3.0]non-5-ene imidazopyridines, triazoles, pyridines, dipyridines, terpyridines, phenanthrolines, quinolines, isoquinolines, amidines and guanidines.

12. A process according to claim 2 wherein said catalyst is selected from the group 1,10-phenanthroline, 2,2'-dipyridyl, 2-phenylimidazole, 1,8-diazobicyclo [5.4.0]undec-7-ene, 1,1,3,3-tetramethylguanidine, imidazo[1,2-a]pyridine, and 2,2':6',2"-terpyridine.

13. A process according to claim 2 wherein said catalyst is selected from the group consisting of 1,6-diazacyclo [4.3.0]non-5-ene imidazopyridines, triazoles, pyridines, dipyridines, terpyridines, phenanthrolines, quinolines, isoquinolines, amidines and guanidines.

14. A process according to claim 3 wherein said catalyst is selected from the group 1,10-phenanthroline, 2,2'-dipyridyl, 2-phenylimidazole, 1,8-diazobicyclo [5.4.0]undec-7-ene, 1,1,3,3-tetramethylguanidine, imidazo [1,2-a]pyridine, and 2,2':6',2"terpyridine.

15. A process according to claim 3 wherein said catalyst is selected from the group consisting of 1,6-diazacyclo [4.3.0]non-5-ene imidazopyridines, triazoles, pyridines, dipyridines, terpyridines, phenanthrolines, quinolines, isoquinolines, amidines and guanidines.

16. An improved polycarbonate resin prepared by a process from reactants selected from the group consisting of dihydric phenols, copolymers of dihydric phenols with glycol, copolymers of dihydric phenols with glycol, copolymers of dihydric phenols with acid terminated polyesters, copolymers of dihydric phenols with hydroxy terminated polyesters and copolymers of dihydric phenols with dibasic acids in the presence of a nitrogen-containing compound selected from the group consisting of 1,10phenanthroline, 2,2'-dipyridyl,2-phenylimidazole, 1,8-diazobicyclo [5.4.0] undec-7-ene, 1,1,3,3-tetramethylguanidine, imidazo[1,2-a]pyridine, and 2,2':6',2"-terpyridine wherein said compound is volatile and distills front the resin unchanged over the course of the reaction wherein the improvement comprises the reduction of impurities through the preparation of said resin by said process.

* * * * *